(12) United States Patent
Koyama et al.

(10) Patent No.: US 8,643,898 B2
(45) Date of Patent: Feb. 4, 2014

(54) DEVICE, METHOD, SYSTEM, AND COMPUTER PROGRAM PRODUCT FOR DETERMINING AMOUNT OF INK TO BE FORMED IN A REGION OF A MEDIUM BASED ON A COMPUTED DEFORMATION RATIO

(75) Inventors: Minoru Koyama, Nagano (JP); Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 13/346,853

(22) Filed: Jan. 10, 2012

(65) Prior Publication Data

US 2012/0182584 A1    Jul. 19, 2012

(30) Foreign Application Priority Data

Jan. 19, 2011    (JP) ................. 2011-008606

(51) Int. Cl.
*H04N 1/387* (2006.01)
*G06K 15/02* (2006.01)
*G06T 17/20* (2006.01)
*B41M 3/00* (2006.01)
B41J 2/01 (2006.01)
B29C 37/00 (2006.01)
G06K 15/10 (2006.01)

(52) U.S. Cl.
CPC .......... *G06K 15/1868* (2013.01); *H04N 1/3872* (2013.01); *B29C 37/00* (2013.01); *G06K 15/102* (2013.01); *G06K 2215/0082* (2013.01); *B41M 3/00* (2013.01); *B41J 2/01* (2013.01); *G06T 17/20* (2013.01)
USPC .......... 358/1.9; 358/3.24; 358/1.18; 358/502; 427/264; 427/275; 264/132; 345/419; 345/423

(58) Field of Classification Search
USPC ............. 358/1.9, 3.01, 3.24, 3.26, 1.18, 501, 358/502, 518, 520, 521, 530, 540; 347/1–19, 101–107; 382/141–143, 382/154, 274, 275, 285; 700/197, 200; 264/129, 132, 134; 427/256–276; 345/420, 423, 581
See application file for complete search history.

(56) References Cited

U.S. PATENT DOCUMENTS

| | | | |
|---|---|---|---|
| 6,271,856 B1 * | 8/2001 | Krishnamurthy | 345/581 |
| 2012/0038639 A1 * | 2/2012 | Mora et al. | 345/420 |

FOREIGN PATENT DOCUMENTS

| | | | |
|---|---|---|---|
| JP | 08-321949 A | 12/1996 |
| JP | 11-119409 A | 4/1999 |
| JP | 2003-260772 A | 9/2003 |
| JP | 2003-346177 A | 12/2003 |
| JP | 2005-199625 A | 7/2005 |

* cited by examiner

*Primary Examiner* — Scott A Rogers
(74) *Attorney, Agent, or Firm* — Global IP Counselors, LLP

(57) ABSTRACT

A plurality of grid points for forming a quadrangle, and an internal point included within the quadrangle, are quasi-formed on a medium prior to deformation, and position information is acquired that relates to the positions of the quasi-formed grid points and internal point moved in conjunction with the deformation of the medium. A triangle deformation ratio is acquired from the areas of triangles formed by the grid points and internal point before and after deformation, and a discharge amount of ink formed on the medium is computed in accordance with the deformation ratio after deformation, with respect to the triangles before deformation.

16 Claims, 6 Drawing Sheets

DEVICE, METHOD, SYSTEM, AND COMPUTER PROGRAM PRODUCT FOR DETERMINING AMOUNT OF INK TO BE FORMED IN A REGION OF A MEDIUM BASED ON A COMPUTED DEFORMATION RATIO

CROSS-REFERENCE TO RELATED APPLICATIONS

This application claims priority to Japanese Patent Application No. 2011-008606 filed on Jan. 19, 2011. The entire disclosure of Japanese Patent Application No. 2011-008606 is hereby incorporated herein by reference.

BACKGROUND

1. Technical Field

The present invention relates to an image processing device, and to an image processing method and program for the same, and more specifically relates to an image processing device for processing an image formed by a colorant on a medium that is deformed by molding, and to an image processing method and program for the same.

2. Related Art

As an example of this type of image processing device, a device has been proposed for fabricating a block copy and printing the block copy, the block copy having a design required by a designer in a case in which a printed test block copy having a grid formed thereon is molded into a finished three-dimensional object which is digitized together with the original block copy into a computer to comprehend such characteristics as the properties of printing with respect to the three-dimensional object or the deformation condition of the method for fabrication into a three-dimensional object, and a three-dimensional object is molded (refer to Japanese Laid-Open Patent Publication No. 11-119409, for example). A technique has also been proposed for correcting the distortion of the picture of a picture film before and after molding thereof and recording the result as a mapping function, fabricating a printed picture that is deformed based on the mapping function so as to cancel out the distortion of the picture, recording the film density variation before and after molding as a density variation function, and correcting the density of the printed picture based on the density variation function (refer to Japanese Laid-Open Patent Publication No. 2005-199625, for example).

SUMMARY

However, in the device of Japanese Laid-Open Patent Publication No. 11-119409, although the shape after molding is considered, color density is not considered. In the device of Japanese Laid-Open Patent Publication No. 2005-199625, the density variation of the picture is corrected by a film density variation, but color correction is inadequate in the case that the corrected units are basic grid units. The molded picture film is also sometimes curved, and the correction processing is complex. Processing is also complex in the case that the corrected units are color dot units.

The present invention was developed in view of such problems, and one object of the present invention is to provide an image processing device capable of more appropriately computing the formation amount of a functional material by simpler processing, and to provide an image processing method and program for the same.

The present invention employs the means described below to achieve the objects of the present invention.

An image processing device according to one aspect of the present invention is a device for processing an image formed by a functional material on a medium that is deformed by molding. The image processing device includes a quasi-formation part, a position information acquisition part, a deformation ratio acquisition part and a computation part. The quasi-formation part is configured to quasi-form a plurality of grid points for forming a quadrangle and an internal point that is included within the quadrangle on the medium prior to deformation of the medium. The position information acquisition part is configured to acquire position information relating to positions of the grid points and the internal point quasi-formed by the quasi-formation part after the grid points and the internal point are moved in conjunction with deformation of the medium. The deformation ratio acquisition part is configured to acquire a deformation ratio from a first triangle to a second triangle based on an area of the first triangle formed by the internal point and two of the grid points prior to deformation, and an area of the second triangle formed by the internal point and two of the grid points after deformation. The computation part is configured to compute a formation amount of the functional material to be formed in a region of the first triangle of the medium in accordance with the deformation ratio.

In this image processing device, a plurality of grid points for forming a quadrangle, and an internal point included within the quadrangle are quasi-formed on a medium prior to deformation, and position information is acquired that relates to the positions of the quasi-formed internal point and grid points moved in conjunction with the deformation of the medium. A triangle deformation ratio is acquired from the areas of triangles formed by the grid points and internal point before and after deformation, and a formation amount is computed for a functional material formed on the medium in accordance with the deformation ratio after deformation, with respect to the triangles before deformation. The internal point included in the quadrangle is thus used to divide the quadrangle into triangles and perform correction for each triangle. The area of the medium after deformation can therefore be more easily computed, and a computation of the formation amount of the functional material is possible that takes into account the deformation ratio within the quadrangle. Consequently, it is possible to more appropriately compute the formation amount of the functional material by simpler processing using the internal point of the quadrangle. The expression "quasi-formed on the medium" refers to pseudo-formation on the medium, and may mean forming a grid-point image in an image on the medium or forming (e.g., printing, affixing, or otherwise forming) grid points on a prototype medium. The "position information" may include coordinate values of grid points, for example. The term "quadrangle" may refer to a quadrangle that is the smallest unit of the units formed by a plurality of grid points. The term "triangle" may refer to a triangle that is the smallest unit of the units formed by the plurality of grid points and an internal point.

The quasi-formation part may form the internal point at the intersection of two diagonals of the quadrangle prior to the deformation of the medium. The movement state of the grid points before and after deformation is thereby easier to ascertain. At this time, the position information acquisition part more preferably quasi-forms grid points at equal intervals in the up-down and left-right directions on the medium prior to the deformation; specifically, the position information acquisition part quasi-forms a plurality of grid points for forming a square on the medium prior to the deformation.

In the image processing device of as described above, the quasi-formation part is preferably configured to form the internal point at an intersection of two diagonals of the quadrangle prior to deformation of the medium. It is thereby possible to more appropriately compute the formation amount of the functional material by simpler processing using the intersection of the diagonals.

Alternatively, the quasi-formation part is preferably configured to form the internal point at a position of the medium prior to deformation corresponding to a position determined based on a midpoint of two diagonals of the quadrangle after deformation of the medium. It is thereby possible to more appropriately compute the formation amount of the functional material by simpler processing using the midpoint of two diagonals. Alternatively, the quasi-formation part may form the internal point at the position of the medium prior to the deformation that corresponds to the larger amount of movement in the height direction due to the deformation, among the midpoints of the diagonals of the quadrangle after the deformation of the medium. It is thereby possible to more appropriately compute the formation amount of the functional material by simpler processing using the midpoint of the diagonal having the larger amount of movement. Alternatively, the internal point may be the position of the medium prior to the deformation that corresponds to the midpoint of a line segment connecting the midpoint of a first diagonal and the midpoint of a second diagonal, as a position that is determined based on the midpoint of two diagonals.

Alternatively, the quasi-formation part is preferably configured to form the internal point at a position of the medium prior to deformation corresponding to a position of largest or smallest distance in a height direction included within the quadrangle after deformation of the medium. It is thereby possible to more appropriately compute the formation amount of the functional material by simpler processing using the position of largest or smallest distance.

A configuration may be adopted in which the quasi-formation part is configured to determine whether the quadrangle formed by the grid points is maintained from before to after deformation of the medium based on the acquired position information of the grid points, and to omit formation of the internal point for the quadrangle prior to deformation when the quadrangle is maintained from before to after deformation of the medium. Processing can thereby be simplified by omitting the setting of an internal point for quadrangles that are maintained, i.e., quadrangles that have the same deformation ratio, from before to after deformation. Here, to say that a "quadrangle is maintained from before to after deformation" may mean that the shape and size of the quadrangle are the same before and after deformation of the medium, or that the size of the quadrangle is different but the shape thereof is the same before and after deformation. The quasi-formation part may also determine that a quadrangle in which there is no variation in the height direction from before to after deformation of the medium is a quadrangle that is maintained from before to after deformation of the medium.

In the image formation device as described above, the computation part is preferably configured to compute the formation amount of the functional material so that the higher the deformation ratio is the greater the formation amount becomes. It is thereby possible to more appropriately compute the formation amount of the functional material.

In the image processing device of the present invention, the functional material may be an ink. The functional material may also be a toner.

An image processing method according to another aspect of the present invention is a method for processing an image formed by a functional material on a medium that is deformed by molding. The image processing method includes: quasi-forming a plurality of grid points for forming a quadrangle and an internal point that is included within the quadrangle on the medium prior to deformation of the medium; acquiring position information relating to positions of the grid points and the internal point quasi-formed by the quasi-formation part after the grid points and the internal point are moved in conjunction with deformation of the medium; acquiring a deformation ratio from a first triangle to a second triangle based on an area of the first triangle formed by the internal point and two of the grid points prior to deformation, and an area of the second triangle formed by the internal point and two of the grid points after deformation; and computing a formation amount of the functional material to be formed in a region of the first triangle of the medium in accordance with the deformation ratio.

In this image processing method, as in the image processing device described above, the internal point included in the quadrangle is used to divide the quadrangle into triangles and compute the formation amount of the functional material for each triangle. The area of the medium after deformation can therefore be more easily computed, and a computation of the formation amount of the functional material is possible that takes into account the deformation ratio within the quadrangle. Consequently, it is possible to more appropriately compute the formation amount of the functional material by simpler processing using the internal point of the quadrangle. In this image processing method, various embodiments of the image processing device described above may be used, and steps which realize the functions of the image processing device described above may also be added.

The program according to another aspect of the present invention is designed to realize the steps of the image processing method described above in one or more computers. The program may be recorded in a non-transitory computer useable recording medium (e.g., hard disk, ROM, FD, CD, DVD, or the like) that is readable by computer, or may be delivered from one computer to another computer via a transmission medium (Internet, LAN, or other communication network), or may be transferred by any other method. Insofar as the program is executed by one computer or the steps thereof are executed in distributed fashion by a plurality of computers, the steps of the image processing method described above are executed, and the same operational effects as those of the image processing method are therefore obtained.

The printing system according to another aspect of the present invention comprises a storage unit in which the program described above is stored, and a printer for printing the image based on printing data outputted from the personal computer. The steps of the image processing method described above are executed by this printing system, and the same operational effects as those of the image processing method are therefore obtained.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
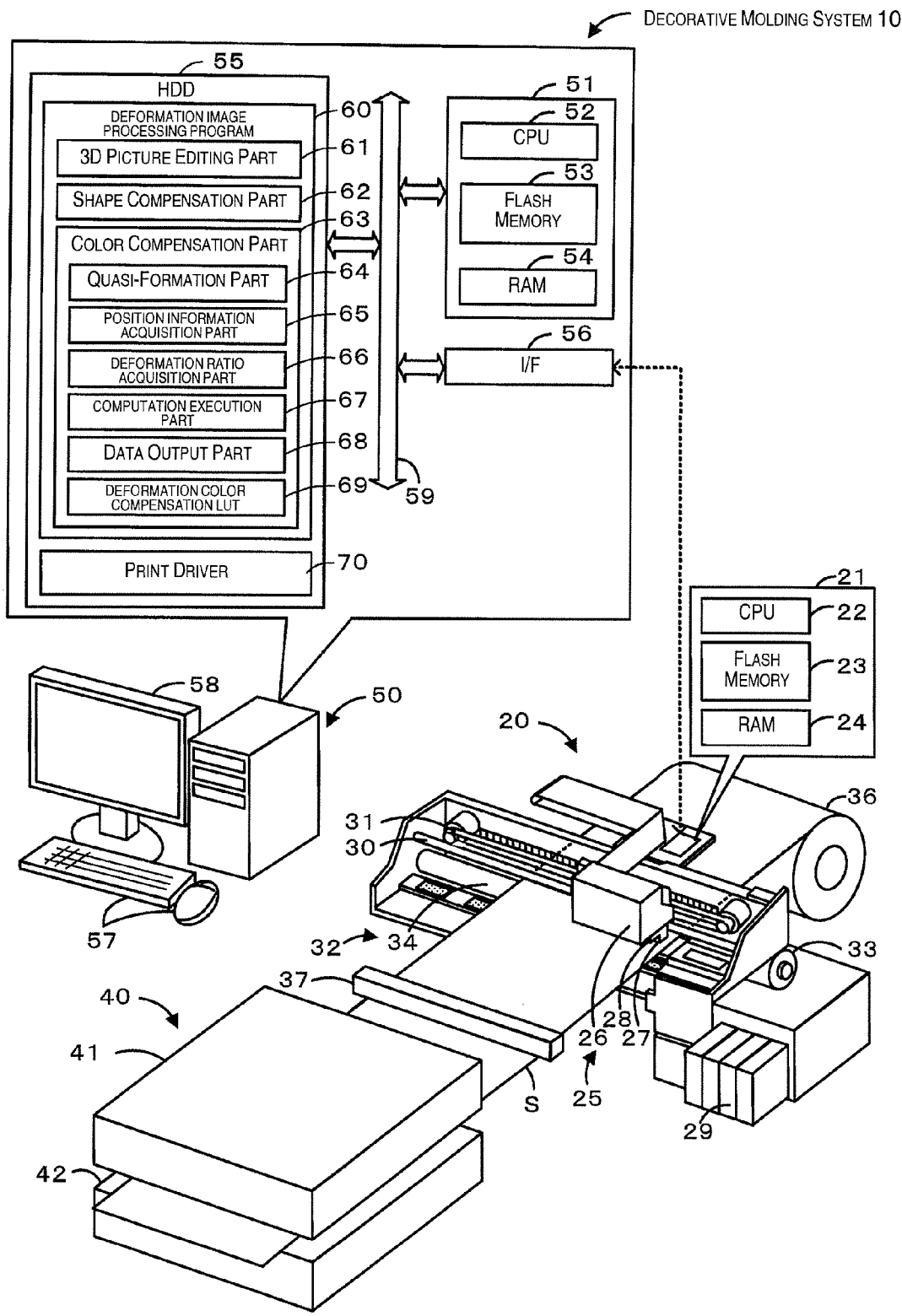
FIG. 1 is a schematic view showing an example of the overall configuration of the decorative molding system 10.

Embodiments of the present invention will next be described using the accompanying drawings. FIG. 1 is a schematic view showing an example of the overall configuration of a decorative molding system 10 as the present embodiment. As shown in FIG. 1, the decorative molding system 10 of the present embodiment is provided with a printer 20 for forming an image by discharging ink onto a medium S that is withdrawn from a roll 36; a molding device 40 for deforming the medium S after image formation and molding the medium S into a solid object; and a personal computer (PC) 50 having the function of an image processing device for outputting printing data, the personal computer (PC) 50 being connected so as to be capable of communicating data to the printer 20. The printer 20 and the personal computer 50 constitute a printing system.

The printer 20 is configured as a printing device capable of executing decorative printing processing for printing on a resin sheet or other medium S (e.g., a polyethylene film or the like). The printer 20 is provided with a controller 21 for controlling the device as a whole; a printing mechanism 25 for discharging ink to the medium S; and a conveyance mechanism 32 for conveying the medium S. The controller 21 is configured as a microprocessor centered around a CPU 22, and is provided with a flash memory 23 capable of storing various processing programs and rewriting data, a RAM 24 for performing such functions as temporarily storing data and preserving data, and other components. The controller 21 receives the printing data from the PC 50 and controls the printing mechanism 25 or the conveyance mechanism 32 so as to execute printing processing. The printing mechanism 25 is provided with a carriage 26 which is reciprocated left and right (primary scanning direction) along a carriage shaft 30 by a carriage belt 31; a print head 28 for applying pressure to an ink to discharge ink droplets from nozzles 27; and a cartridge 29 for accommodating various colors of ink. The print head 28 is provided below the carriage 26, and discharges each color of ink from the nozzles 27 provided to a bottom surface of the print head 28 by a scheme in which a voltage is applied to a piezoelectric element to cause the piezoelectric element to deform and apply pressure to the ink. The mechanism for applying pressure to the ink may also function by using heat of a heater to form a bubble. The cartridge 29 is mounted on the main body side of the device and separately accommodates colors of ink such as cyan (C), magenta (M), yellow (Y), and black (K), and feeds the accommodated ink to the print head 28 via tubes not shown in the drawing. The conveyance mechanism 32 is driven by a drive motor 33, and is provided with a conveyance roller 34 for conveying the medium S, and other components.

The molding device 40 is a device for molding the medium S into a desired three-dimensional shape after an image has been formed on the medium S by the printer 20. The molding device 40 is provided with a top die part 41 disposed above the medium S and a bottom die part 42 disposed below the medium S. A metal mold not shown in the drawing is set in the top die part 41 or the bottom die part 42, and molds the medium S into a three-dimensional shape by holding the medium S therebetween. The medium S may be molded by hot forming or compression molding. The metal mold that is set in the molding device 40 can be replaced with a plurality of types of different metal molds. Before molding or after molding, the medium S is cut to a predetermined length by a cutter 37 disposed between the printer 20 and the molding device 40.

The PC 50 is a multi-purpose personal computer configured as an image processing device and printing control device used by a user. The PC 50 is provided with a controller 51 for controlling the device as a whole; a high-capacity memory HDD 55 as a storage unit for storing various application programs or various data files; and a network interface (I/F) 56 for performing data input and output with respect to the printer 20 and other external instruments. The controller 51 is provided with a CPU 52 for executing various types of control; a flash memory 53 for storing various types of control programs; a RAM 54 for temporarily storing data; and other components. The PC 50 is provided with a keyboard, mouse, or other input device 57 for inputting various commands of a user; a display 58 for displaying various types of information; and other components. The PC 50 has the function of executing operations in accordance with the input operation when a user performs an input operation via the input device 57 using a cursor or the like that is displayed on the display 58. The controller 51, HDD 55, I/F 56, input device 57, display 58, and other components are electrically connected by a bus 59 and configured so as to be able to exchange various control signals and data.

Figure 2:
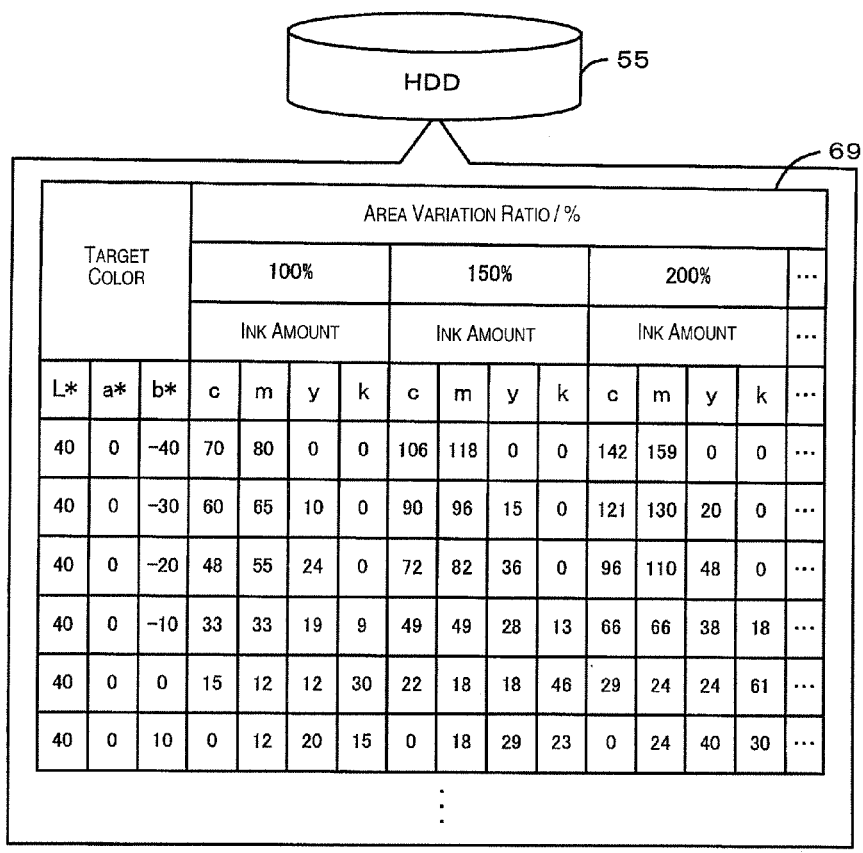
FIG. 2 is a view showing an example of the deformation color compensation LUT 69.

An application program not shown in the drawing, a deformation image processing program 60, a print driver 70, and the like are stored in the HDD 55 of the PC 50. The deformation image processing program 60 is a program used when the image formed on the medium S is corrected for color misalignment or shape misalignment that occurs after molding (after deformation) of the medium S, and the deformation image processing program 60 has a 3D picture editing part 61, a shape compensation part 62, a color compensation part 63, and other parts. The 3D picture editing part 61 has the function of editing the image formed on the medium S before molding, and editing the image formed on the medium S after molding. The shape compensation part 62 has the function of performing shape compensation whereby a shape variation of a design (characters or pattern) on the molded article surface that occurs due to deformation of the external shape during molding of the medium S is corrected to obtain the desired shape. The color compensation part 63 has the function of performing color compensation whereby a variation in hue of the molded article due to deformation during molding of the medium S is corrected to obtain the desired hue. The color compensation part 63 has a quasi-formation part 64, a position information acquisition part 65, a deformation ratio acquisition part 66, a computation execution part 67, a data output part 68, a deformation color compensation LUT 69, and other components. The quasi-formation part 64 has the function of quasi-forming a plurality of grid points for forming a plurality of quadrangles, and internal points included within the quadrangles on the medium S prior to deformation. The quasi-formation part 64 quasi-forms grid points which form a square on the medium S prior to deformation. The quasi-formation part 64 also has the function of performing processing whereby the internal point is formed at the intersection of two diagonals of a quadrangle prior to deformation of the medium S. The expression "quasi-formed on the medium" refers to pseudo-formation on the medium, and may mean forming a grid-point image on image data of the medium. The position information acquisition part 65 has the function of acquiring position information relating to the positions of the quasi-formed grid points and internal point that are moved in conjunction with deformation of the medium S. The position information acquisition part 65 has the function of acquiring position information in the form of coordinates (X coordinate, Y coordinate, Z coordinate) to which the grid points are moved after molding (after deformation) of the medium S. The deformation ratio acquisition part 66 has the function of computing and acquiring a deformation ratio of triangles from the area of a triangle formed by the grid points and internal point prior to deformation and the area of a triangle formed by the grid points and internal point after deformation. The term "quadrangle" may refer to a quadrangle that is the smallest unit of the units formed by a plurality of grid points, and the term "triangle" may refer to a triangle that is the smallest unit of the units formed by the plurality of grid points and an internal point. The computation execution part 67 has the function of computing, using the deformation color compensation LUT 69, the formation amount (discharge amount; also referred to as the ink amount of a colorant (ink) formed on the medium S, according to the deformation ratio after deformation with respect to a triangle prior to deformation. The data output part 68 has the function of outputting the computed printing image to the print driver 70. The deformation color compensation LUT 69 is a correlation table in which the relationship between the color value of the desired color for the molded object after deformation of the medium S, the deformation ratio of the medium S, and the amount of ink formed on the medium S is empirically determined. FIG. 2 is a view showing an example of the deformation color compensation LUT 69. In the deformation color compensation LUT 69 shown in FIG. 2, for each specified color value and deformation ratio of the medium S, the amount of ink of each color is derived for achieving the specified color value after the medium S has been deformed by the specified deformation ratio. The established trend in the deformation color compensation LUT 69 is that for the same color value, the formation amount of colorant increases the greater the deformation ratio is after deformation. The deformation color compensation LUT 69 used is one in which data between each stored value are developed into a LUT having more grid point data by a publicly known tetrahedral interpolation processing. FIG. 2 shows only a portion of the deformation color compensation LUT 69. The 3D picture editing part 61, the shape compensation part 62, and the color compensation part 63 are incorporated into the deformation image processing program 60 as a 3D picture editing module program, a shape compensation module program, and a color compensation module program, respectively. The quasi-formation part 64, the position information acquisition part 65, the deformation ratio acquisition part 66, the computation execution part 67, and the data output part 68 are incorporated into the color compensation part 63 as a position information acquisition module, a deformation ratio acquisition module, a computation execution module, and a data output module, respectively. These modules are executed by the controller 51 to perform each of the functions described above. The print driver 70 is a program for converting a print job received from an application program into print data that can be directly printed by the printer 20, and outputting (transmitting) the print data to the printer 20. The print driver 70 also has the function of outputting the print data created by the deformation image processing program 60 to the printer 20.

Figure 3:
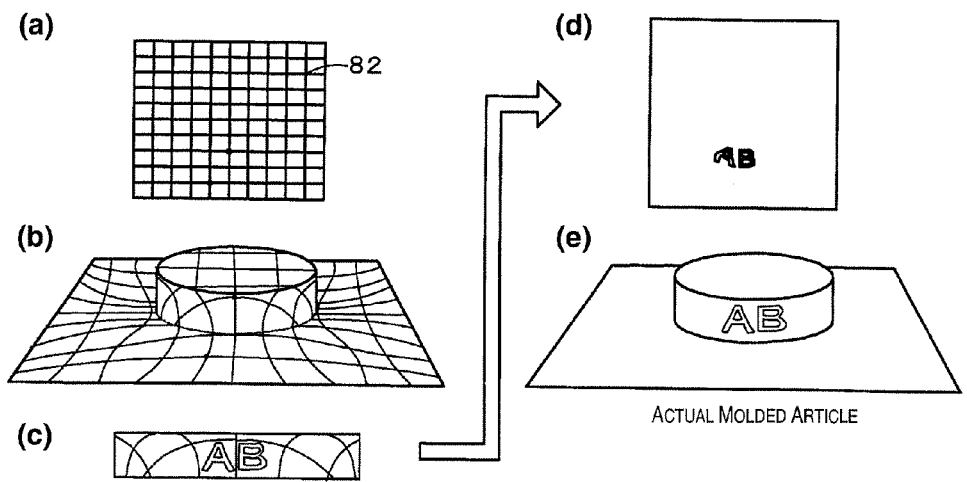
FIG. 3 is a view showing the shape compensation processing of the deformation image processing program 60.

Image processing by the decorative molding system 10 of the present embodiment configured as described above will next be described, beginning with the processing performed by the shape compensation part 62. FIG. 3 is a view showing the shape compensation processing executed by the deformation image processing program 60. As shown in FIG. 3, when the 3D picture editing part 61 and the shape compensation part 62 are activated, the CPU 52 creates an image in which grid points 82 are formed at equal intervals in the vertical and horizontal directions and a grid linking the grid points is formed on a flat medium (FIG. 3(*a*)). Processing is then performed for deforming the medium so as to mold to the shape of a desired product, and the three-dimensional coordinate positions of the grid points 82 after deformation, the distortion directions of the grid, and the distortion amounts are then calculated. Based on the calculation results, a three-dimensional model image of the molded solid object is created and processed for display on the display 58 (FIG. 3(*b*)). A picture is then formed on the surface of the three-dimensional model by a user input operation (FIG. 3(*c*)), and when a two-dimensional conversion instruction is inputted, the coordinate values in three dimensions are converted to coordinate values in two dimensions, and the converted image is displayed (FIG. 3(*d*)). An image having the shape of the desired picture after molding is thus formed on the sheet prior to molding, and block copy image data can be created for printing on the medium S prior to molding. The block copy data are then subjected to the color compensation processing described below.

Figure 4:
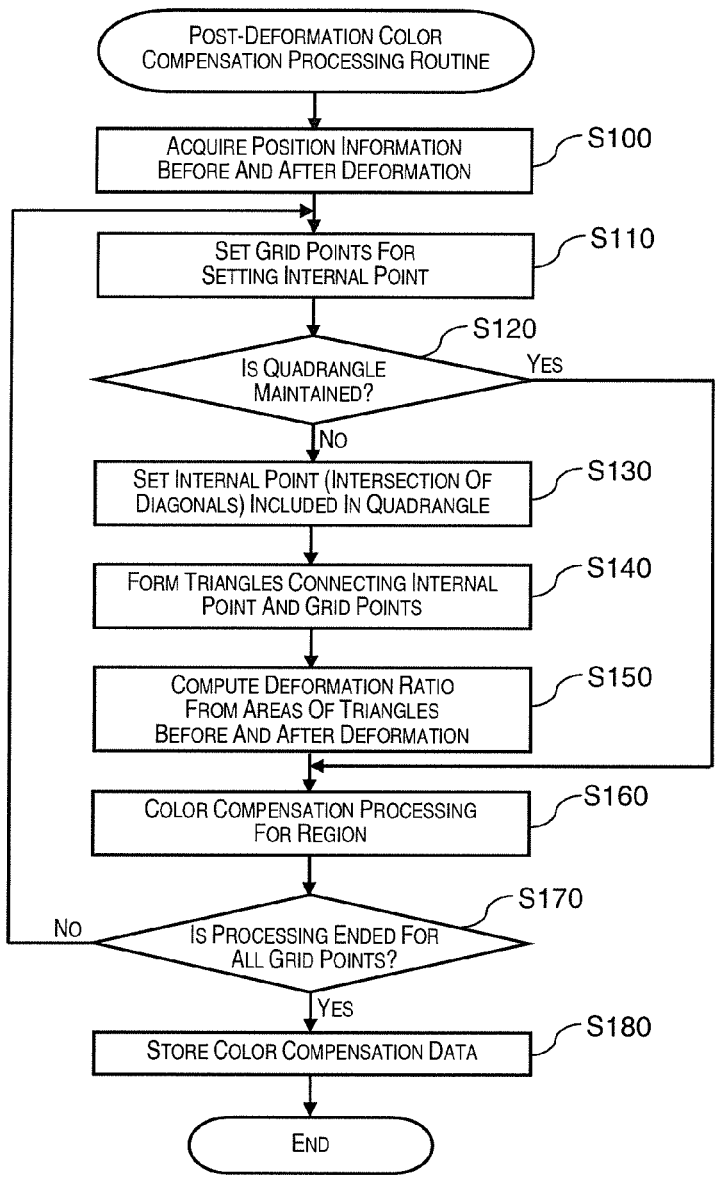
FIG. 4 is a flowchart showing an example of the post-deformation color compensation processing routine.
Figure 5:
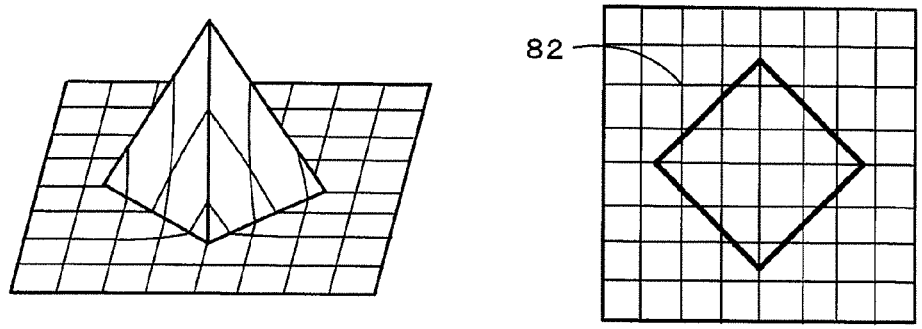
FIG. 5 is a view showing an example of an actual molded article.

The processing of color compensation for the molded article deformed by molding will next be described. FIG. 4 is a flowchart showing an example of the post-deformation color compensation processing routine executed by the CPU 52 of the controller 51. This routine is stored in the HDD 55 and is executed after an execution instruction for color compensation is inputted. The command to execute color compensation may be inputted by, for example, clicking a color compensation execution button that is displayed on a screen after block copy image data for which the abovementioned shape compensation has been performed are selected on an editing screen (not shown in the drawing) of the deformation image processing program 60 displayed on the display 58. This color compensation processing is executed by the functions of the color compensation part 63, such as the quasi-formation part 64, the position information acquisition part 65, the deformation ratio acquisition part 66, the computation execution part 67, the data output part 68, and the deformation color compensation LUT 69. In this post-deformation color compensation processing, since the color variation increases in response to an increase in the deformation ratio of the medium S, processing is performed in which the deformation ratio is used as a basis for correcting the amount of ink used during image formation prior to fabrication. A case of molding a quadrangular pyramid as shown in FIG. 5 will be described as a specific example. FIG. 5 is a view showing an example of an actual molded article.

When this routine is executed, the CPU 52 acquires the position information of the grid points from before and after deformation fabrication (step S100). Here, position information is acquired by acquiring the three-dimensional coordinates (X, Y, Z) of the grid points prior to deformation fabrication, found by the shape compensation processing described above, and acquiring the three-dimensional coordinates (X, Y, Z) of the grid points after deformation fabrication. Here, the image shown in FIG. 5 in which a plurality of grid points 82 is arranged at equal intervals in the up-down and left-right directions of a plane is acquired as the position information prior to the deformation fabrication, and the image of the quadrangular pyramid is acquired as the position information after the deformation fabrication. The CPU 52 then sets the grid points for setting the internal point from among the post-deformation grid points (step S110). The grid points used to set the internal point may be set in order from the four grid points of the quadrangle in the upper left corner to the right, and then from top to bottom, for example. The CPU 52 then determines whether the quadrangle after deformation fabrication has been maintained in what was the rectangular shape thereof prior to the deformation fabrication, based on the three-dimensional coordinates of the grid points (step S120). A rectangle can be determined to have been maintained from before to after the deformation fabrication when the shape and size of the quadrangle are the same before and after deformation of the medium, when the size of the quadrangle is different but the shape thereof is the same, or when the sides of the quadrangle all have the same length.

Figure 6:
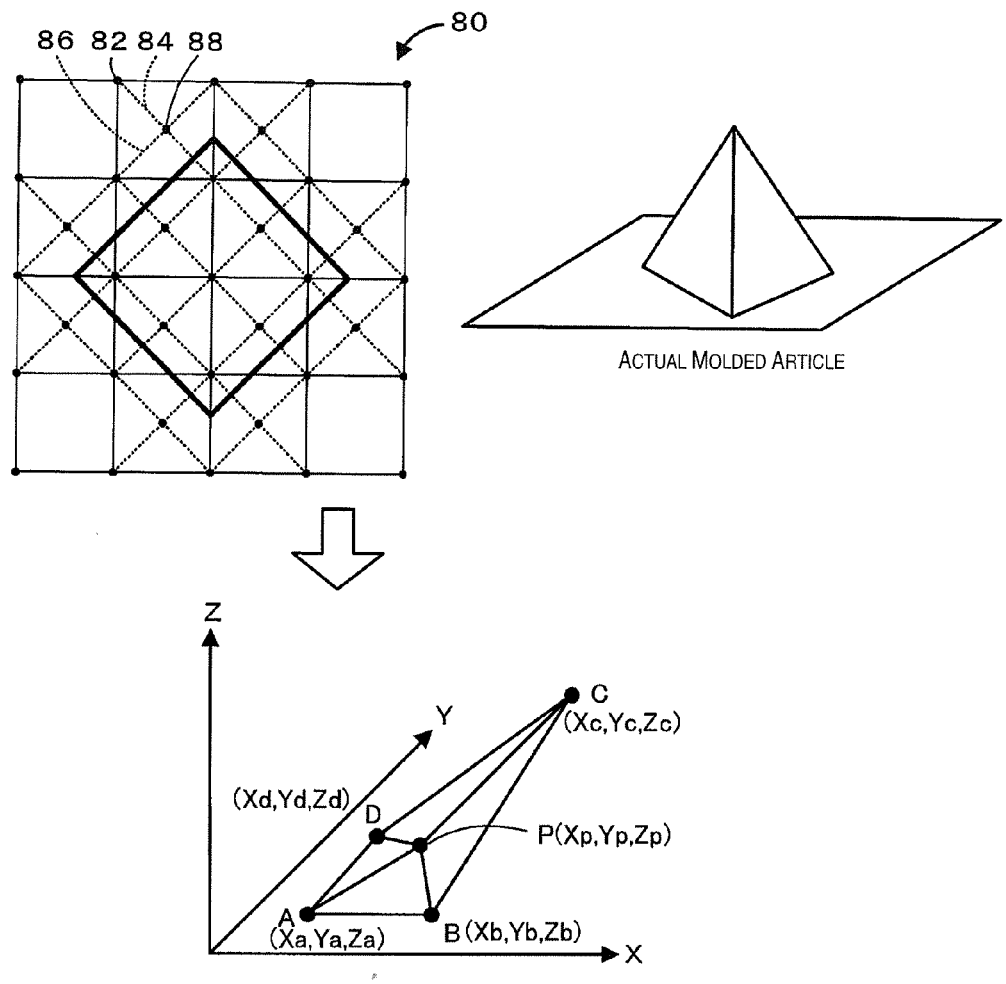
FIG. 6 is a view showing the block copy data 80.

When the quadrangle is maintained as a rectangle from before to after the deformation fabrication, the rectangle is assumed to have no deformation, and color compensation processing according to the deformation ratio is executed for this region without modification (step S160). Color compensation processing will be described in detail hereinafter. When the quadrangle is not maintained as a rectangle from before to after the deformation fabrication, a deformation is assumed to have occurred in a region of the quadrangle, and the processing of steps S130 through S150 for dividing the rectangular region by an internal point is executed. For example, in the case that the quadrangle is deformed, it is possible that there is a region with a high deformation ratio and a region with a low deformation ratio in the quadrangle. Here, processing is performed for dividing regions of different deformation ratios by a simple process using an internal point. Specifically, the intersection of two diagonals of the rectangle prior to deformation fabrication is set as the internal point (step S130), and processing is performed for connecting the internal point and the grid points to form triangles (step S140). FIG. 6 is a view showing the block copy data 80. FIG. 6 shows a state in which the grid count is reduced. As shown in FIG. 6, the internal point 88 at the intersection of the first diagonal 84 and the second diagonal 86 is set for a rectangle formed by deformed grid points 82, and this rectangle is processed as four triangular regions.

The position of the internal point after deformation fabrication is then calculated, the area of a triangle formed by the grid points and internal point prior to deformation, and the area of the triangle formed by the grid points and internal point after deformation are calculated, and the post-deformation area is divided by the pre-deformation area to compute the deformation ratio of the triangle (step S150). Here, a deformation ratio is computed for four triangles formed by four grid points and one internal point. The position of the internal point after deformation of the medium S is found by calculation in the same manner as the movement of the grid points, by the function of the shape compensation part 62.

After step S150, or when the rectangle is maintained from before to after deformation fabrication in step S120, the CPU 52 executes color compensation processing for the pre-deformation rectangular region that corresponds to the set post-deformation quadrangle (step S160). Here, color compensation processing is executed for each triangle region for the rectangular region in which the internal point is set. In the case that a plurality of colors is present in a region, color compensation processing is executed for each color. In the color compensation processing, processing is performed for setting the ink amount for each color used in the region, according to the desired color value and deformation ratio and using the deformation color compensation LUT 69. In the color compensation processing, in such cases as when the desired color value and deformation ratio are between values stored in the deformation color compensation LUT 69, the appropriate ink amount is approximated by calculation by a publicly known tetrahedral interpolation processing. In this color compensation processing, when color values are the same according to the deformation color compensation LUT 69, the formation amount of ink is computed so as to be greater the larger the deformation ratio is after deformation. When the rectangle is maintained from before to after deformation fabrication in step S120, since there is no variation in the deformation ratio within the rectangular region from before to after deformation fabrication, the processing for dividing the rectangular region using an internal point can be omitted.

The CPU 52 then determines whether processing is ended for all the grid points (step S170), and when processing is not ended for all grid points, the CPU 52 repeats the processing of step S110 and subsequent steps. When processing is ended for all the grid points, the CPU 52 stores the color compensation data in the HDD 55 (step S180) and ends this routine. In the color compensation processing described above, the rectangle is divided by the internal point 88, and color correction is executed according to the deformation ratio of each triangle formed by this division, as shown in FIG. 6. For example, in a case in which the grid is rectangular, after deformation of the medium S, each grid point moves three-dimensionally, and the quadrangle formed by the four grid points after the grid points have moved is sometimes not planar. As shown in the specific example at the bottom of FIG. 6, the surface formed by grid point A (Xa, Ya, Za), grid point B (Xb, Yb, Zb), grid point C (Xc, Yc, Zc), and grid point D (Xd, Yd, Zd) after deformation of the medium S is a curved surface instead of a flat surface. In order to compute the area of this curved surface, the shape of the curved surface must be inferred from a relationship with other outside grid points, or some other processing must be performed. Here, an internal point P is provided inside the rectangle formed by the grid points, the post-deformation quadrangle is divided into triangles using this internal point P (Xp, Yp, Zp) and the areas thereof are computed, and more ideal color correction for each triangle is thereby realized.

The correspondence between the constituent elements of the present embodiment and the constituent elements of the present invention is clarified herein. The controller 51 and quasi-formation part 64 of the present embodiment correspond to the quasi-formation part of the present invention, the controller 51 and position information acquisition part 65 correspond to the position information acquisition part of the present invention, the controller 51 and deformation ratio acquisition part 66 correspond to the deformation ratio acquisition part, and the controller 51 and computation execution part 67 correspond to the computation execution means. The ink corresponds to the colorant and the functional material. In the present embodiment, the description of the operation of the PC 50 also clarifies an example of the image processing method of the present invention.

By the PC 50 of the present embodiment described in detail above, a plurality of grid points for forming a plurality of squares, and an internal point included within the square are quasi-formed on a medium S prior to deformation, and position information is acquired relating to the positions of the quasi-formed grid points and internal point moved in conjunction with deformation of the medium S. The deformation ratio of a triangle formed by the grid points and the internal point is then computed from the area of the triangle before and after deformation, and the discharge amount of ink formed on the medium S is computed according to the deformation ratio after deformation for the triangle prior to deformation. Since the internal point is thus used to divide the square into triangles and computation is performed for each triangle, the post-deformation area of the medium S can be computed by a simpler method, and a computation of the ink discharge amount is possible that takes into account the deformation ratio within the quadrangle. Consequently, it is possible to more appropriately compute the discharge amount of ink by simpler processing using the internal point of a square. Since grid points forming a square (rectangle) are quasi-formed, the movement state of the grid points from before to after deformation is more easily assessed.

Since the internal point is the intersection of two diagonals of the quadrangle prior to deformation of the medium S, the ink discharge amount can be more appropriately computed by simpler processing using the intersection of the diagonals. Furthermore, when a quadrangle is maintained from before to after deformation of the medium S, since the formation of an internal point is omitted for the quadrangle prior to deformation, processing can be simplified. Furthermore, since the ink discharge amount is computed so as to be greater the greater the deformation ratio is after deformation, more appropriate color correction can be performed. Furthermore, since the deformation color compensation LUT 69 is used for correlation, the ink discharge amount can be computed easily relative to calculation based on a correlation scheme, for example.

The present invention is not limited by the embodiment described above, and can be implemented in various ways within the technical scope of the present invention.

Figure 7:
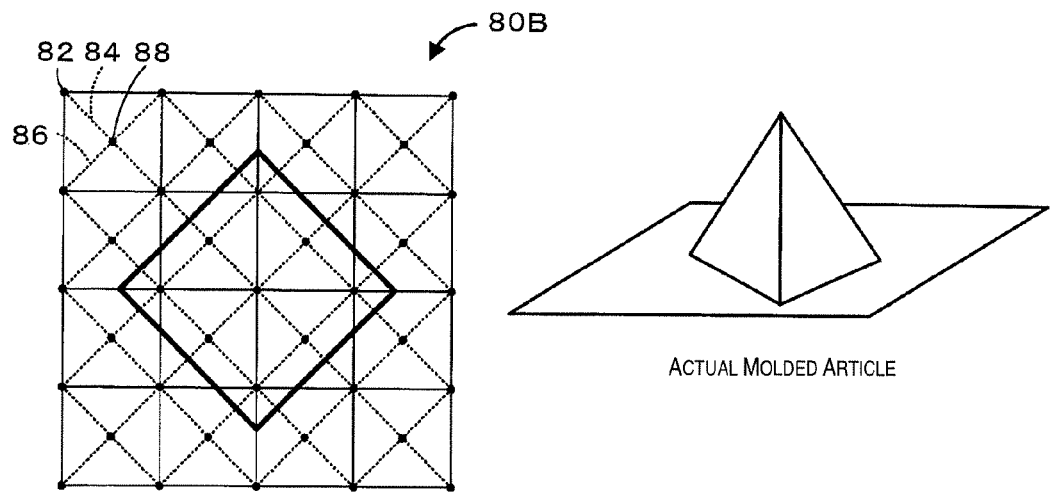
FIG. 7 is a view showing an example of another set of block copy data 80B.

For example, in the embodiment described above, an internal point is not set for quadrangles that are maintained from before to after deformation fabrication, but the present invention is not limited to this particular configuration, and an internal point may be set for all quadrangles. FIG. 7 is a view showing an example of another set of block copy data 80B. As shown in FIG. 7, a configuration may be adopted in which, for example, the internal point 88 is set from the intersection of the first diagonal 84 and the second diagonal 86 for all the quadrangles formed by the grid points 82. In this case as well, when there are regions of differing deformation ratios within the quadrangle, the ink discharge amount can be more appropriately computed by simpler processing using the internal point. Here, to say that a "quadrangle is maintained from before to after deformation" may mean that the shape and size of the quadrangle are the same before and after deformation of the medium, or that the size of the quadrangle is different but the shape thereof is the same before and after deformation. A determination may also be made that a quadrangle in which there is no variation in the height direction from before to after deformation of the medium is a quadrangle that is maintained from before to after deformation of the medium.

In the embodiment described above, grid points quasi-formed on the medium S prior to deformation fabrication are uniformly arranged to form a square grid, but the present invention not limited to this particular configuration, and the grid points may have a rectangular arrangement or be arranged in staggered fashion or in positions somewhat offset from square or rectangular. A rectangular shape is preferred, and a square shape is more preferred for assessing the positional relationship of the grid points before and after deformation fabrication.

Figure 8:
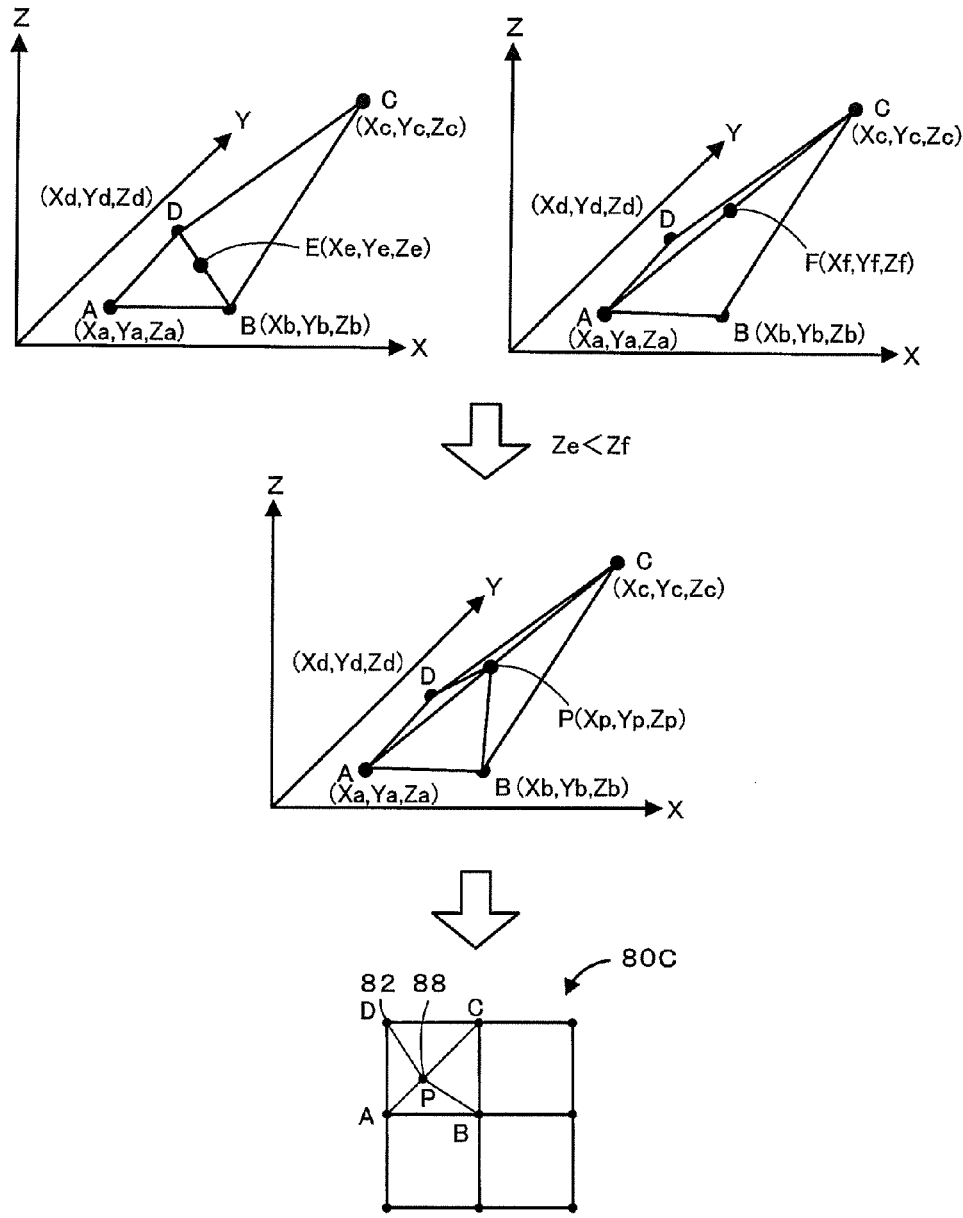
FIG. 8 is a view showing an example of the processing for setting a the internal point.

In the embodiment described above, the internal point 88 is the intersection of two diagonals of the medium S prior to deformation fabrication, but the present invention is not limited to this particular configuration, and the internal point may be a position of the medium S prior to deformation that corresponds to a position that is determined based on the midpoint of two diagonals of the quadrangle after deformation of the medium S, for example. The internal point may be a position of the medium prior to deformation that corresponds to the midpoint of a diagonal of the quadrangle after deformation of the medium, in which there is a large amount of movement in the height direction, for example. FIG. 8 is a view showing an example of the processing for setting an internal point. As shown in FIG. 8, movement of the grid points 82 can sometimes cause two diagonals formed by two of four points to no longer intersect. Here, the midpoint having the larger amount of movement among the midpoints of the two diagonals is set as the internal point. Specifically, after deformation of the medium S, the midpoint E (Xe, Ye, Ze) of the diagonal formed by grid point B (Xb, Yb, Zb) and grid point D (Xd, Yd, Zd) is quasi-formed. The midpoint F (Xf, Yf, Zf) of the diagonal formed by grid point A (Xa, Ya, Za) and grid point C (Xc, Yc, Zc) after deformation of the medium S is also quasi-formed. The heights Z of the two midpoints are then compared. The midpoint F having a larger amount of movement in the height direction Z is then set as the internal point P (Xp, Yp, Zp). To have "a larger amount of movement in the height direction" means to be more positive on the plus side and more negative on the minus side. The position of the internal point prior to deformation is then found by calculation, and block copy data 80C are created that include the grid points 82 and the internal point 88. The ink discharge amount can thereby be more appropriately computed by simpler processing using the midpoint of the diagonal that connects two of four grid points.

Figure 9:
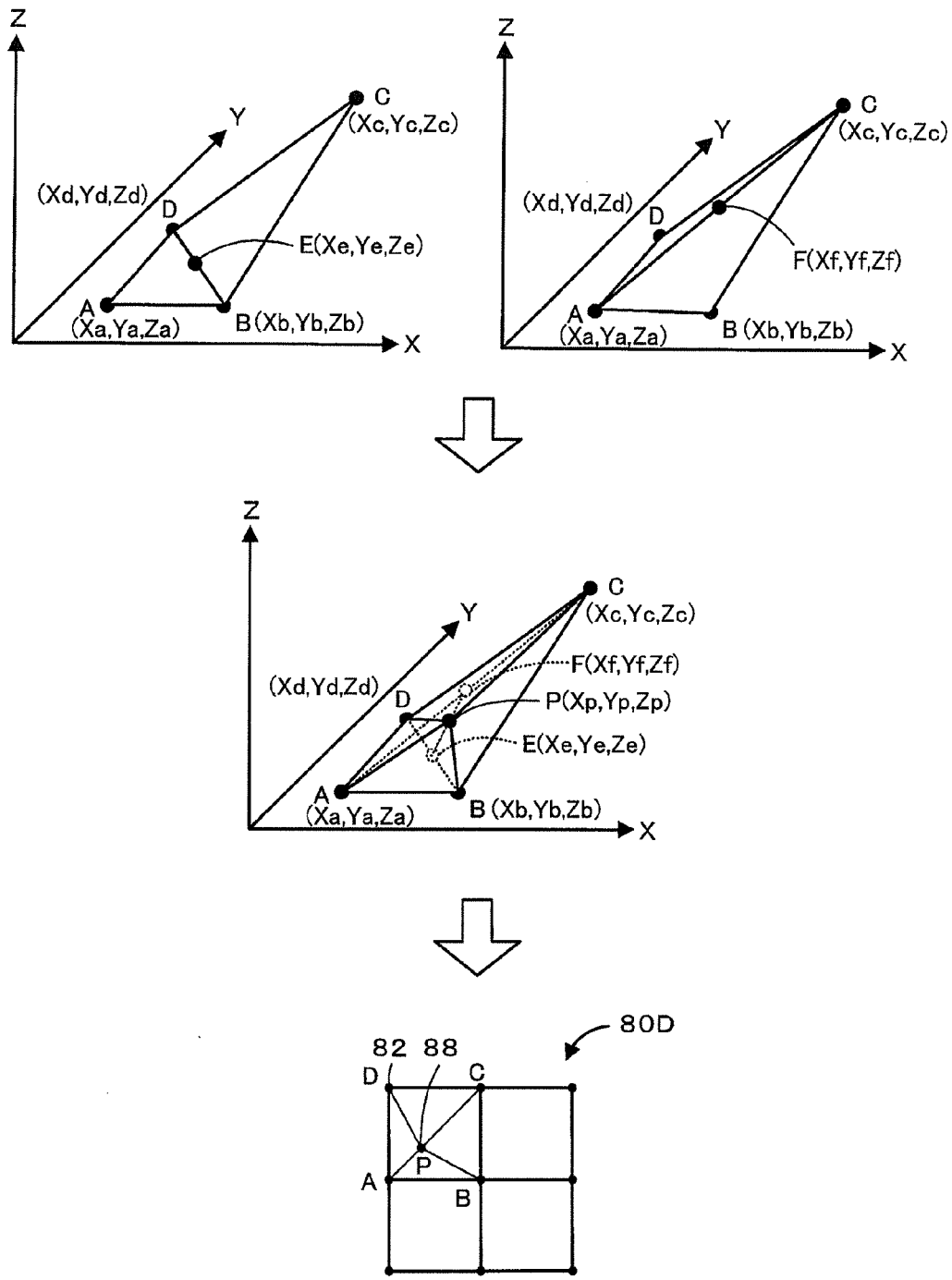
FIG. 9 is a view showing an example of the processing for setting another internal point.

Alternatively, the internal point may be the position of the medium S prior to the deformation that corresponds to the midpoint of a line segment connecting the midpoint of a first diagonal and the midpoint of a second diagonal, as a position that is determined based on the midpoint of two diagonals of a quadrangle after deformation of the medium. FIG. 9 is a view showing an example of the processing for setting another internal point. Here, after deformation of the medium S, the midpoint E (Xe, Ye, Ze) of the diagonal formed by grid point B (Xb, Yb, Zb) and grid point D (Xd, Yd, Zd) is quasi-formed. The midpoint F (Xf, Yf, Zf) of the diagonal formed by grid point A (Xa, Ya, Za) and grid point C (Xc, Yc, Zc) after deformation of the medium S is also quasi-formed. The midpoint of the line segment EF connecting the midpoints of the two diagonals is then set as the internal point P (Xp, Yp, Zp). The position of the internal point prior to deformation is then found by calculation, and block copy data 80D are created that include the grid points 82 and the internal point 88. The ink discharge amount can thereby be more appropriately computed by simpler processing using the midpoint of the diagonal that connects two of four grid points.

In the embodiment described above, the internal point 88 is at the intersection of two diagonals of the medium S prior to deformation fabrication, but the internal point may also be at the position of the medium S prior to the deformation that corresponds to the position of largest or smallest size (distance) in the height direction included within the quadrangle formed by the grid points after deformation of the medium S, for example. Specifically, after deformation of the medium S, the normal-line vector of the surface formed by four grid points is computed for each quadrangle, and the grid points and normal-line vectors are analyzed also for the adjacent surfaces formed by the other grid points to assess the position of largest size or the position of smallest size of the surface for forming the next internal point. The assessed position of largest size or position or smallest size is set as the internal point. The position of the internal point prior to deformation is then found by calculation, and block copy data are created. Alternatively, a grid for shape compensation and a grid for color compensation that has a lower grid point density than the grid for shape compensation are created, and these grids are used to execute shape compensation and color compensation. At this time, the position of largest size or smallest size of the surface formed by four grid points after deformation of the medium S may be found in the grid for color compensation from the grid for shape compensation that has a high grid point density, and the position of largest size or smallest size thus found may be designated as the internal point. It is thereby possible to more appropriately compute the ink discharge amount by simpler processing using the position of largest or smallest size. The internal point P may be provided at any position of a quadrangle formed by four grid points. Regardless of the position of the internal point, the post-deformation area can be more easily computed, and the deformation ratio can be more easily computed.

In the embodiment described above, the three-dimensional shape after molding, i.e., the three-dimensional coordinates (position information) of the grid points 82, is acquired by a software program using the 3D picture editing part 61 or the shape compensation part 62, but the present invention is not limited to this particular configuration, and a configuration may be adopted in which the three-dimensional coordinates of the grid points are acquired by actually fabricating a molded article by deforming a medium S on which a grid is formed, and measuring the molded article. In this case, the shape compensation processing can be performed by a procedure such as the following. For example, a grid is formed on a medium S of the same material as the desired product, and the positions of the grid points are recorded as two-dimensional coordinates. The medium S is then molded by the molding device 40 under the conditions for manufacturing the desired product. The positions of the grid points on the molded (deformed) medium S are measured, and the positions of the grid points are recorded as three-dimensional coordinates. The coordinates before and after deformation fabrication can then be correlated to obtain position information. The position information may be acquired at this time by inputting the three-dimensional coordinates of the measured grid points through use of the input device 57. The expression "quasi-formed on the medium" may mean forming (e.g., printing, affixing, or otherwise forming) grid points on a prototype medium.

In the embodiment described above, color compensation is performed by an ink discharge amount that increases the larger the deformation ratio is, but the present invention is not limited to this particular configuration. Correction for color compensation is also performed using the deformation color compensation LUT 69 in the embodiment described above, but the present invention is not limited to this particular configuration, and the formation amount of colorant may also be computed by calculation using a correlation scheme for color value, deformation ratio, and colorant formation amount.

The colorant is an ink in the embodiment described above, but the colorant is not limited to ink in particular insofar as the colorant can be used to form an image on the medium S. A functional material that can be formed on the medium, e.g., a fluid such as a gel, or a toner or other powder may be used. An ink may be obtained by dissolving in a solvent, or may be a liquid body (liquid dispersion) in which grains of a functional material are dispersed. The ink may also include a liquid other than a solvent or a dispersion medium. The ink may also be a transparent ink.

In the embodiment described above, the deformation ratio of triangles is computed from the areas of the triangles before and after deformation of the medium, but the present invention is not limited to this particular configuration insofar as a deformation ratio of triangles is found. For example, since the internal point is provided at the center of the grid in the embodiment, the areas of the triangles that are formed including the internal point of the medium S prior to deformation are all equal. Consequently, when the deformation ratio is computed based on the areas of triangles before and after deformation, the area as such of a triangle that includes the internal point after deformation may be designated as the deformation ratio.

In the embodiment described above, the printer 20 is provided with an inkjet-type printing mechanism 25 for discharging ink, but the present invention is not limited to this particular configuration, and a laser printer, a heat-transfer printer, or a dot impact printer may also be used. An image processing device such as the PC 50 is also used, but the present invention may be implemented as an image processing method or as a program capable of executing the image processing method.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image processing device for processing an image formed by a functional material on a medium that is deformed by molding, the image processing device comprising:
   a quasi-formation part configured to quasi-form a plurality of grid points for forming a quadrangle and an internal point that is included within the quadrangle on the medium prior to deformation of the medium;

a position information acquisition part configured to acquire position information relating to positions of the grid points and the internal point quasi-formed by the quasi-formation part after the grid points and the internal point are moved in conjunction with deformation of the medium;

a deformation ratio acquisition part configured to acquire a deformation ratio from a first triangle to a second triangle based on
   an area of the first triangle formed by the internal point and two of the grid points prior to deformation, and
   an area of the second triangle formed by the internal point and two of the grid points after deformation; and a computation part configured to compute a formation amount of the functional material to be formed in a region of the first triangle of the medium in accordance with the deformation ratio.

2. The image processing device according to claim 1, wherein
the quasi-formation part is configured to form the internal point at an intersection of two diagonals of the quadrangle prior to deformation of the medium.

3. The image processing device according to claim 1, wherein
the quasi-formation part is configured to form the internal point at a position of the medium prior to deformation corresponding to a position determined based on a midpoint of two diagonals of the quadrangle after deformation of the medium.

4. The image processing device according to claim 3, wherein
the quasi-formation part is configured to form the internal point at one of positions of the medium prior to deformation corresponding to midpoints of diagonals of the quadrangle after deformation of the medium, which has a larger amount of movement in a height direction due to deformation.

5. The image processing device according to claim 1, wherein
the quasi-formation part is configured to form the internal point at a position of the medium prior to deformation corresponding to a position of largest or smallest distance in a height direction included within the quadrangle after deformation of the medium.

6. The image processing device according to claim 1, wherein
the quasi-formation part is configured to determine whether the quadrangle formed by the grid points is maintained from before to after deformation of the medium based on the acquired position information of the grid points, and to omit formation of the internal point for the quadrangle prior to deformation when the quadrangle is maintained from before to after deformation of the medium.

7. The image processing device according to claim 1, wherein
the computation part is configured to compute the formation amount of the functional material so that the higher the deformation ratio is the greater the formation amount becomes.

8. The image processing device according to claim 1, wherein
the functional material is an ink.

9. An image processing method for processing an image formed by a functional material on a medium that is deformed by molding, the image processing method comprising:

quasi-forming a plurality of grid points for forming a quadrangle and an internal point that is included within the quadrangle on the medium prior to deformation of the medium;

acquiring position information relating to positions of the grid points and the internal point quasi-formed by the quasi-formation part after the grid points and the internal point are moved in conjunction with deformation of the medium;

acquiring a deformation ratio from a first triangle to a second triangle based on
   an area of the first triangle formed by the internal point and two of the grid points prior to deformation, and
   an area of the second triangle formed by the internal point and two of the grid points after deformation; and computing a formation amount of the functional material to be formed in a region of the first triangle of the medium in accordance with the deformation ratio.

10. The image processing method according to claim 9, wherein
the quasi-forming of the internal point includes quasi-forming the internal point at an intersection of two diagonals of the quadrangle prior to deformation of the medium.

11. The image processing method according to claim 9, wherein
the quasi-forming of the internal point includes quasi-forming the internal point at a position of the medium prior to deformation corresponding to a position determined based on a midpoint of two diagonals of the quadrangle after deformation of the medium.

12. The image processing method according to claim 10, wherein
the quasi-forming of the internal point includes quasi-forming the internal point at one of positions of the medium prior to deformation corresponding to midpoints of diagonals of the quadrangle after deformation of the medium, which has a larger amount of movement in a height direction due to deformation.

13. The image processing method according to claim 9, wherein
the quasi-forming of the internal point includes quasi-forming the internal point at a position of the medium prior to deformation corresponding to a position of largest or smallest distance in a height direction included within the quadrangle after deformation of the medium.

14. The image processing method according to claim 9, further comprising
determining whether the quadrangle formed by the grid points is maintained from before to after deformation of the medium based on the acquired position information of the grid points, and
omitting the acquiring of the position information when the quadrangle is maintained from before to after the deformation of the medium.

15. A non-transitory computer usable medium storing a computer program for causing a computer to execute steps of the image processing method according to claim 9.

16. A printing system comprising:
a personal computer provided with a memory unit including the non-transitory computer usable medium according to claim 15; and
a printer configured to print the image based on printing data outputted from the personal computer.

* * * * *